(12) United States Patent
Olson

(10) Patent No.: US 7,512,721 B1
(45) Date of Patent: Mar. 31, 2009

(54) METHOD AND APPARATUS FOR EFFICIENT DETERMINATION OF STATUS FROM DMA LISTS

(75) Inventor: Dave Olson, Palo Alto, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 982 days.

(21) Appl. No.: 10/963,287

(22) Filed: Oct. 11, 2004

Related U.S. Application Data

(60) Provisional application No. 60/574,402, filed on May 25, 2004, provisional application No. 60/599,565, filed on Aug. 5, 2004, provisional application No. 60/599,605, filed on Aug. 5, 2004.

(51) Int. Cl.
*G06F 13/28* (2006.01)
(52) U.S. Cl. ...................................... 710/22
(58) Field of Classification Search .................... 710/22
See application file for complete search history.

(56) References Cited

U.S. PATENT DOCUMENTS

| | | | |
|---|---|---|---|
| 5,610,745 A | | 3/1997 | Bennett |
| 6,055,583 A | * | 4/2000 | Robbins ...................... 710/22 |
| 6,230,282 B1 | | 5/2001 | Zhang |
| 6,430,652 B1 | | 8/2002 | Fechser et al. |
| 6,625,672 B1 | | 9/2003 | Rojemo |
| 6,771,569 B2 | | 8/2004 | Nagata et al. |
| 7,313,643 B2 | * | 12/2007 | Sakurai et al. .............. 710/315 |
| 2002/0095536 A1 | | 7/2002 | Emberty et al. |
| 2003/0028804 A1 | | 2/2003 | Noehring et al. |
| 2003/0041176 A1 | * | 2/2003 | Court et al. .................. 709/251 |
| 2004/0153619 A1 | | 8/2004 | Geens et al. |
| 2004/0181635 A1 | | 9/2004 | Huras et al. |
| 2005/0033874 A1 | * | 2/2005 | Futral et al. .................... 710/22 |
| 2005/0055536 A1 | | 3/2005 | Ansari et al. |
| 2005/0182886 A1 | | 8/2005 | Edirisooriya et al. |
| 2005/0286856 A1 | | 12/2005 | Aerts |

OTHER PUBLICATIONS

"Office Action from USPTO dated Apr. 25, 2008 for U.S. Appl. No. 10/940,355".
"Final Office Action from USPTO dated Oct. 27, 2008 for U.S. Appl. No. 10/940,355".

* cited by examiner

*Primary Examiner*—Niketa I Patel
*Assistant Examiner*—David E Martinez
(74) *Attorney, Agent, or Firm*—Klein, O'Neill & Singh, LLP

(57) ABSTRACT

Preferred embodiments of the present invention increase the efficiency of access to a constructed list of memory locations, or DMA list by a host processor. In order to circumvent the problem of latency between an I/O device and the host processor, preferred embodiments of the present invention store a copy of the DMA head pointer in the system memory, as well as on the I/O device. When the head pointer data is changed on the I/O device, the I/O device will use DMA to write the updated head pointer back to system memory.

14 Claims, 2 Drawing Sheets

METHOD AND APPARATUS FOR EFFICIENT DETERMINATION OF STATUS FROM DMA LISTS

RELATED APPLICATIONS

This application claims priority under 35 U.S.C. § 119(e) from U.S. Provisional Patent Application Ser. No. 60/574,402, filed May 25, 2004, from U.S. Provisional Patent Application Ser. No. 60/599,565, filed Aug. 5, 2004, and from U.S. Provisional Patent Application No. 60/599,605, filed Aug. 5, 2004. The entirety of each of these provisional patent applications is incorporated herein by reference.

BACKGROUND OF THE INVENTION

1. Field of the Invention

The present invention relates generally to data transmission and reception and specifically to data transmission and reception in an Interconnect Chip.

2. Description of Background Art

The speed of data read and write within an integrated circuit is affected in part by the cost (in time) of accessing the status of entries in a direct memory access (DMA) list. Each read of the DMA list over a slow connection by a host processor adds a delay in processing, yet to work correctly the host processor needs to know the current status of the DMA list.

DMA occurs when a hardware device transfers data from an input/output (I/O) port of the hardware device to and/or from system memory without direct host processor interaction. DMA lists tell the I/O device which memory locations and ranges are to be transferred, and in which direction. The DMA list is accessed via a DMA head pointer. In a conventional DMA system, head pointer information is read from the I/O device by the host processor, which introduces latency.

In a conventional DMA system, the host processor accesses the DMA head pointer to determine which location in the DMA list is to be processed next. Once the processing of the next item in the DMA list is complete, the conventional approach is to have the host processor read the DMA head pointer from the I/O device to determine if the head pointer has changed. Either the host processor polls the I/O device, or the I/O device interrupts the host processor to be read. In either case, access to the I/O device is slow, and the host processor is stalled until the read of the head pointer is complete.

The typical process for determining memory locations and memory status begins when a host processor constructs a DMA list. The DMA list is then written either directly into the I/O device using programmed input/output (PIO) instructions or into system memory accessed via a head pointer that is written into the I/O device. The I/O device then directly accesses the information in the list by fetching DMA through the DMA head pointer. At this point, the I/O device registers containing the DMA head pointer can be read by the host processor, pointing it to the next item to be processed.

Alternatively, the host processor can access the entries for the DMA list by reading status words directly from system memory. This method has an overhead cost for accessing the status words and determining whether the I/O device or the host processor changed a memory location last.

What is needed are methods and systems for eliminating the delay in conventional DMA.

SUMMARY OF THE INVENTION

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Preferred embodiments of the present invention increase the efficiency of access to a constructed list of memory locations, or DMA list by a host processor. In order to circumvent the problem of latency between an I/O device and the host processor, preferred embodiments of the present invention store a copy of the DMA head pointer in the system memory, as well as on the I/O device. Accessing system memory is faster than accessing the I/O device, and the host processor can continue working during its memory access process. When the head pointer data is changed on the I/O device, the I/O device will use DMA to write the updated head pointer back to system memory.

DETAILED DESCRIPTION OF PREFERRED EMBODIMENTS

A preferred embodiment of the present invention is now described with reference to the figures where like reference numbers indicate identical or functionally similar elements. Also in the figures, the leftmost digit(s) of each reference number correspond(s) to the figure in which the reference number is first used.

The described embodiment of the present invention increases an access rate of a host processor to a DMA list of a host system by storing a copy of a DMA head pointer in system memory of the host, as well as in an I/O device that connects the host system to a network. Accessing system memory is faster than accessing the I/O device, and the host processor can continue working during the memory access process.

Figure 1:
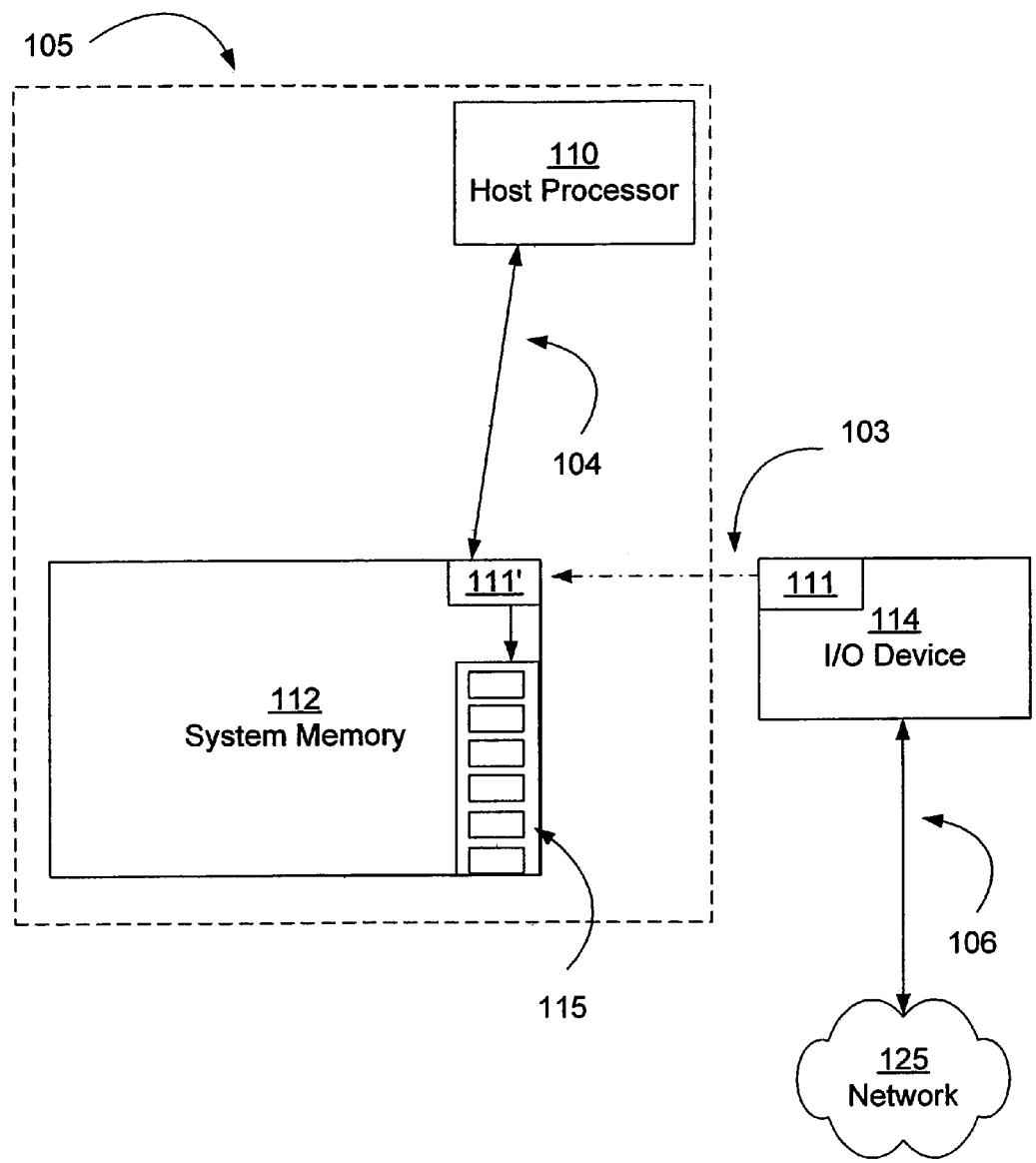
FIG. 1 is a block diagram of a system in accordance with a preferred embodiment of the present invention.

The system of FIG. 1 represents a preferred embodiment of the present invention. Within the context of this preferred embodiment, a host system 105 is in communication with an input/output (I/O) device 114 by way of a bus connection 103. Bus 103 is preferably a packetized bidirectional bus such as HyperTransport protocol or via a non-packetized bus such as PCI Express, although any appropriate bus or protocol may be used. Initially, the host processor 110 constructs a DMA list 115 within the system memory 112 containing various DMA operations. These operations can be, for example, read operations, write operations, or a combination or read and write operations. The host system 105 then writes the DMA list 115 into the I/O device 114 and, through a DMA operation, updates the DMA list tail pointer within the I/O device 114 (not shown) to indicate the entries are ready to process. After the head pointer data 111 is changed on the I/O device 114 (due to completion of a DMA operation), the I/O device 114 uses DMA to write the DMA list head pointer 111 back to the system memory 112, thus invalidating the host processor cache in the process.

Because the DMA head pointer 111' is stored in system memory 112, the host processor 110 can access the DMA list 115 information at any time without incurring the overhead of read from the I/O device 114. This is especially important for polling-based systems, but is also beneficial for interrupt-based systems.

The head pointer 111' in system memory 112 provides a better way to poll for changes in DMA list 115 status. The host processor 110 only needs to look in one low latency location (head pointer 111') rather than reading the location from an I/O device 114, which is slow and stalls the host processor 110 until the read is complete, or checking multiple status word locations in main memory (one per DMA list entry), which needs to be verified for last read/write access.

It is to be understood that the head pointer 111' is typically updated by the I/O device 114 and ready by the host processor 110, not the reverse. This ensures that the I/O device 114 was the last one to write to the memory location. There is a matching tail pointer (not shown) in the I/O device 114 that is written only by the host processor 110 and read by the I/O device 114.

Figure 2:
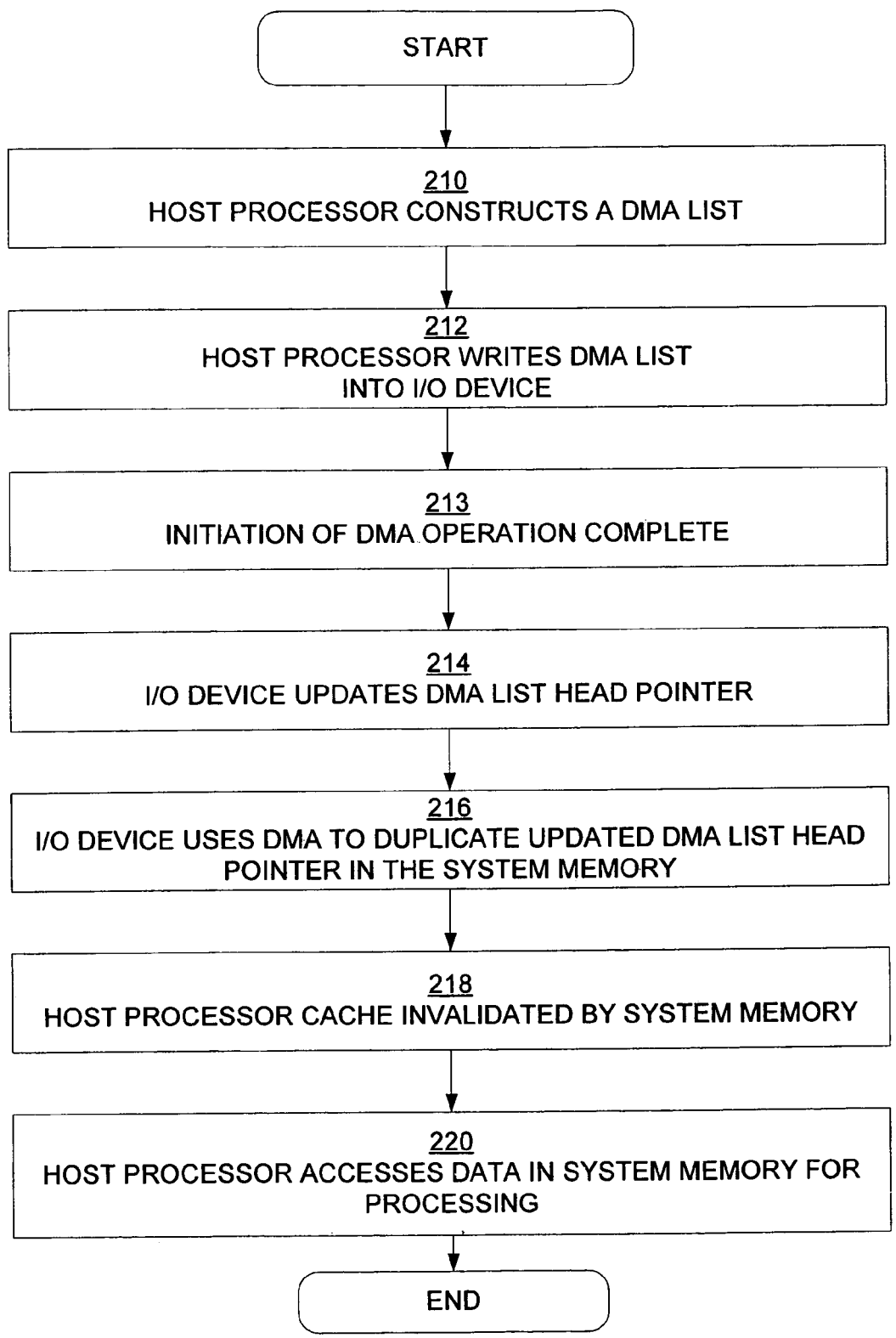
FIG. 2 is a flow diagram illustrating a method in accordance with a preferred embodiment of the present invention.

FIG. 2 is a flow diagram that illustrates a method for carrying out DMA list retrieval in accordance with a preferred embodiment of the present invention. The method begins when a host processor 110 constructs 210 a DMA list 115 and the host processor then writes 212 the DMA list into the I/O device 114. In a data read, for example, the I/O device receives a data packet and eventually the received data is DMA'd to, e.g., a buffer in system memory 112. When the initiation of the DMA transfer operation is complete 213, the I/O device updates 214 the DMA list head pointer 111. The updating 214 of the DMA head pointer 111 is the triggering mechanism for the I/O device to then use DMA to duplicate 216 the updated DMA list head pointer 111 to a copy of the head pointer 111' in system memory 112.

The host processor 110 needs to look only in one low latency location (head pointer 111' in system memory) to determine when data is present in system memory and ready to process rather than reading the head pointer 111 from the I/O device 114. Because the host processor 110 has more direct access to data within system memory 112, and because the host processor does not have to wait for a slow I/O read of the I/O device 114, the entire DMA process is considerably more efficient.

As shown in FIG. 2 updating the head pointer 111' also causes invalidation 218 of the host processor cache (not shown) in system memory 112. Because a read has occurred, the cached data is no longer guaranteed to be reliable. Once host processor 110 determines that the head pointer has changed in value, host processor 110 accesses 220 the data from a buffer in system memory 112.

The present invention may also be used in a system where the I/O device uses DMA to receive data from system memory (i.e., for system writes). In this case, I/O device 114 updates the head pointer when a packet or packets containing the data is sent onto the network from the I/O device.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

That is claimed is:

1. A method performed in a system having an input/output device connected to a host system, comprising:
   a) constructing, by the host system, a direct memory access list, having a head pointer, within a system memory of the host system; wherein the direct memory access list includes information regarding a plurality of direct memory access operations;
   b) writing, by the host system, said direct memory access list and the head pointer into a memory of the input/output device;
   c) updating, by the input/output device, the head pointer of the direct memory access list after a direct memory access operation is complete, the updated head pointer being stored on the input/output device;
   d) duplicating, by the input/output device, the updated head pointer into the system memory of the host system;
   e) determining, by the host system, when the updated head pointer is duplicated into system memory; and
   f) accessing, by the host system, data stored in the system memory as a result of the direct memory access operation in response to the determination that the updated head pointer has been duplicated.

2. The method of claim 1, wherein the duplication of the head pointer occurs after a read operation.

3. The method of claim 1, wherein the duplication of the head pointer occurs after a write operation.

4. The method of claim 1, wherein the duplication of the head pointer by the input/output device is accomplished by using a direct memory access operation.

5. The method of claim 1, wherein the host system and input/output device are connected via a bus whose data access time is slower than access time for the host system to access system memory.

6. The method of claim 1, further comprising:
   determining, by the host system, that a successful data write operation has occurred, the determination made in response to the determination that the updated head pointer has been duplicated.

7. A method performed in a system having an input/output device connected to a host system, comprising:
   (a) constructing a direct memory access list, having a head pointer, within a system memory of a host system; wherein the host system constructs the direct memory access list that includes information regarding a plurality of direct memory access operations;

(b) writing, by the host system, said direct memory access list and the head pointer into a memory of the input/output device;

(c) updating, by the input/output device, the head pointer of the direct memory access list after a direct memory access operation is complete, the updated head pointer being stored on the input/output device;

(d) duplicating, by the input/output device, the updated head pointer into the system memory of the host system;

(e) determining, by the host system, when the updated head pointer is duplicated into system memory; and (f) determining, by the host system, that a successful data write operation has occurred, the determination made in response to the determination that the updated head pointer has been duplicated.

8. The method of claim 7, wherein the duplication of the head pointer occurs after a read operation.

9. The method of claim 7, wherein the duplication of the head pointer by the input/output device is accomplished by using a direct memory access operation.

10. The method of claim 7, wherein the host system and input/output device are connected via a bus whose data access time is slower than access time for the host system to access system memory.

11. A system, comprising:

a host system having a processor and a system memory; and an input/output device operationally coupled to the host system via a bus;

wherein the processor (a) constructs a direct memory access (DMA) list, having a head pointer; (b) stores the DMA list having information regarding a plurality of DMA operations and the header pointer within the system memory; (c) writes the DMA list and the head pointer into a memory of the input/output device; and wherein the input/output device: (i) updates the DMA list and the head pointer after a direct memory access operation is completed; (ii) stores the updated head pointer at the input/output device; and (iii) duplicates the updated head pointer into the system memory of the host system; and wherein the processor determines when the updated head pointer is duplicated into system memory; and accesses data stored in the system memory as a result of the DMA operation in response to the determination that the updated head pointer has been duplicated.

12. The system of claim 11, wherein the duplication of the head pointer occurs after a read operation.

13. The system of claim 11, wherein the updated head pointer is duplicated by the input/output device using a direct memory access operation.

14. The method of claim 11, wherein the bus data access time is slower than access time for the host system to access system memory.

* * * * *

UNITED STATES PATENT AND TRADEMARK OFFICE
CERTIFICATE OF CORRECTION

| | |
|---|---|
| PATENT NO. | : 7,512,721 B1 |
| APPLICATION NO. | : 10/963287 |
| DATED | : March 31, 2009 |
| INVENTOR(S) | : Dave Olson |

Page 1 of 1

It is certified that error appears in the above-identified patent and that said Letters Patent is hereby corrected as shown below:

In column 3, line 21, delete "ready" and insert -- read --, therefor.

Signed and Sealed this

Eighteenth Day of May, 2010

David J. Kappos
*Director of the United States Patent and Trademark Office*